United States Patent [19]

Sakakura

[11] Patent Number: 5,357,557
[45] Date of Patent: Oct. 18, 1994

[54] INTER-MOBILE-TERMINAL TESTING METHOD IN CELLULAR AUTOMOBILE TELEPHONE SYSTEM

[75] Inventor: Yukinori Sakakura, Tokyo, Japan
[73] Assignee: Nec Corporation, Tokyo, Japan
[21] Appl. No.: 971,596
[22] Filed: Nov. 5, 1992
[30] Foreign Application Priority Data
Nov. 6, 1991 [JP] Japan ................................ 3-318309
[51] Int. Cl.⁵ ..................... H04M 1/24; H04M 4/00; H04Q 9/00; H04B 7/00
[52] U.S. Cl. ........................................ 379/27; 379/31; 379/32; 379/34; 379/59; 379/60; 455/33.1; 455/56.1
[58] Field of Search .................. 375/3.1, 10; 455/33.1, 455/33.2, 67.4, 56.1; 379/1, 27, 29, 31, 50, 59, 34, 32

[56] References Cited
U.S. PATENT DOCUMENTS
4,903,323  2/1990  Hendershot ............................ 379/29
4,977,399  12/1990  Price et al. .......................... 455/67.4

OTHER PUBLICATIONS
Telecommunication (Cellular Radio test set) Jul. 1981.
IEE Transactions on Vehicular Technology (Advanced Mobile Phone Service), Franklin Belcher, May 1980.

Primary Examiner—Stephen Chin
Assistant Examiner—Paul Loomis
Attorney, Agent, or Firm—Sughrue, Mion, Zinn, Macpeak & Seas

[57] ABSTRACT

In an inter-mobile-terminal testing method in a cellular automobile telephone system, test sequence information indicating a test sequence, next terminal number information indicating a terminal which is to make a next call, and test data are transmitted and down-loaded from a cellular automobile telephone exchange to each terminal. A test start command is output from the cellular automobile telephone exchange to the first terminal serving as a start point. In response to the test start command, the first terminal makes a call to the second terminal as a next terminal in accordance with the next terminal number information so as to transmit the test data thereto. The second terminal transmits connection determination information indicating success in connection of the call and data determination information indicating correct reception of the test data to the third terminal as a next terminal together with the test data. The same procedure is subsequently executed up to the nth terminal as a last terminal. An accumulated result of the connection determination information between the respective terminals and the data determination information is acquired in the cellular automobile telephone exchange.

2 Claims, 3 Drawing Sheets

FIG. 3

| TEST SEQUENCE INFORMATION | BASE TERMINAL (DIAL No.) | NEXT TERMINAL (DIAL No.) | TEST DATA |
|---|---|---|---|
| (THREE DECIMAL DIGITS) | (SEVEN DECIMAL DIGITS) | (SEVEN DECIMAL DIGITS) | BINARY "100111001" |

| SELF-TEST SEQUENCE INFORMATION | ACCUMULATED TEST RESULT INFORMATION | | | | | | | TEST DATA |
|---|---|---|---|---|---|---|---|---|
| | $C_1 \to C_2$ RESULT | | $C_2 \to C_3$ RESULT | | $C_3 \to C_4$ RESULT | | | |
| | CONNECTION DETERMINATION | DATA DETERMINATION | CONNECTION DETERMINATION | DATA DETERMINATION | CONNECTION DETERMINATION | DATA DETERMINATION | | |
| (THREE DECIMAL DIGITS) | (TWO DIGITS) | (TWO DIGITS) | (TWO DIGITS) | (TWO DIGITS) | (TWO DIGITS) | (TWO DIGITS) | | 100111001 |

→ t

INTER-MOBILE-TERMINAL TESTING METHOD IN CELLULAR AUTOMOBILE TELEPHONE SYSTEM

BACKGROUND OF THE INVENTION

The present invention relates to an inter-mobile-terminal testing method in a cellular automobile telephone system.

In a conventional testing method of this type, incoming call tests, i.e., tests of incoming calls from a cellular automobile telephone exchange to mobile terminals in each cell as a service area, are mainly performed. When an outgoing call test, i.e., the test of an outgoing call from a mobile terminal, or a connection test between mobile terminals is to be performed, an operator visits a corresponding field.

For this reason, outgoing call tests for mobile terminals and connection tests between mobile terminals are very inefficient operations. In addition, since tests include manual operations, it takes much time to perform tests for a large number of combinations of cells.

SUMMARY OF THE INVENTION

It is an object of the present invention to provide an inter-mobile-terminal testing method in a cellular automobile telephone system, which can automatically perform tests between mobile terminals without requiring any manual operation.

In order to achieve the above object, according to the present invention, there is provided an inter-mobile-terminal testing method in a cellular automobile telephone system including a cellular automobile telephone exchange and test mobile terminals respectively arranged in cells, a communication test being performed between the cells, comprising the steps of transmitting and down-loading test sequence information indicating a test sequence, next terminal number information indicating a terminal which is to make a next call, and test data from the cellular automobile telephone exchange to each of the terminals, outputting a test start con, hand from the cellular automobile telephone exchange to a first terminal serving as a start point, causing the first terminal to make a call to a second terminal as a next terminal in accordance with the next terminal number information in response to the test start command so as to transmit the test data thereto, causing the second terminal to transmit connection determination information indicating success in connection of the call and data determination information indicating correct reception of the test data to a third terminal as a next terminal together with the test data, subsequently executing the same procedure up to an nth terminal as a last terminal, and acquiring an accumulated result of the connection determination information between the respective terminals and the data determination information in the cellular automobile telephone exchange.

BRIEF DESCRIPTION OF THE DRAWINGS

FIG. 3 is a view showing a format indicating test conditions; and

FIG. 4 is a view showing a format indicating the contents of test results to be transferred.

DESCRIPTION OF THE PREFERRED EMBODIMENT

An embodiment of the present invention will be described in detail below with reference to the accompanying drawings.

Figure 1:
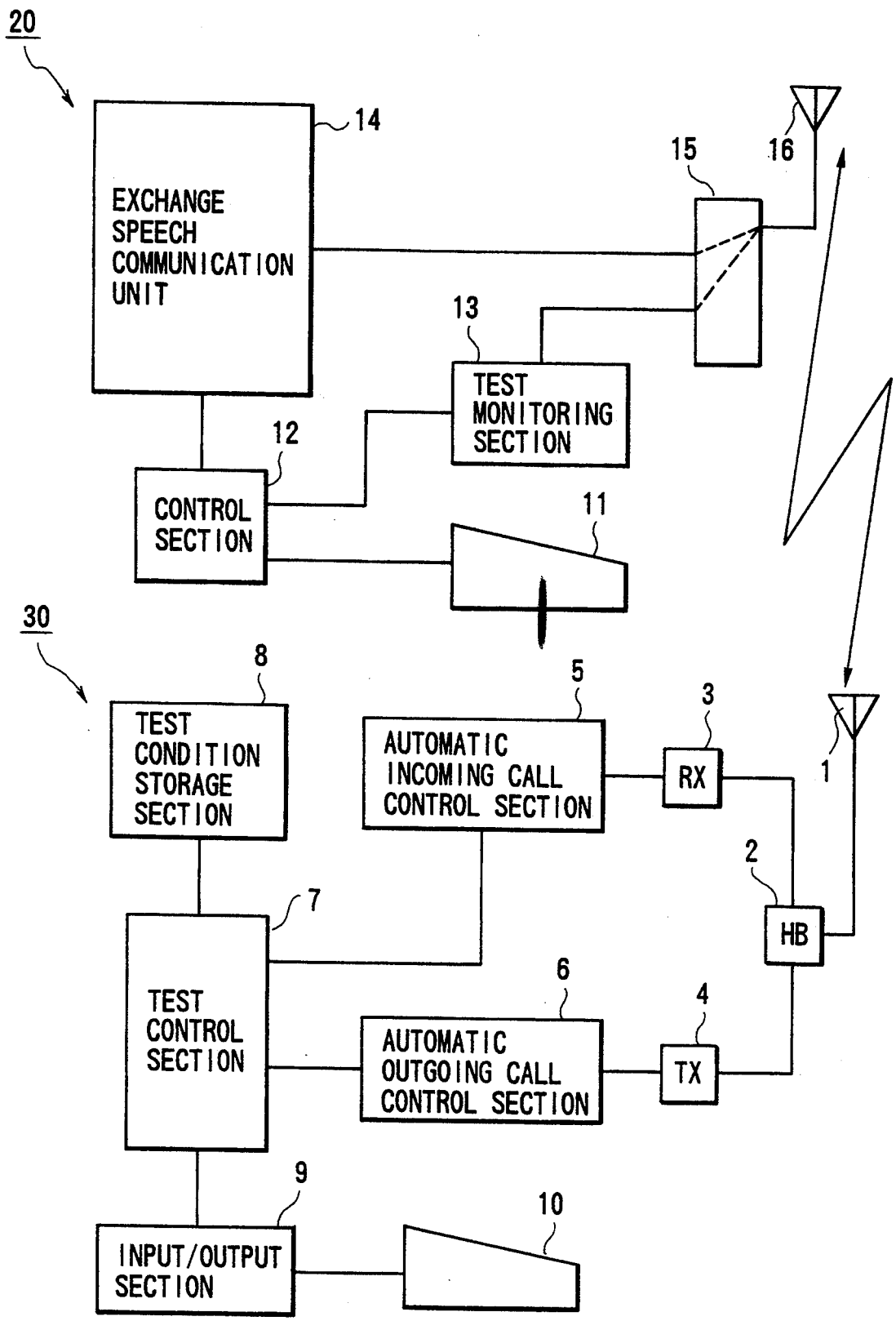
FIG. 1 is a block diagram showing a system according to an embodiment of the present invention.

FIG. 1 shows a system according to an embodiment of the present invention. A cellular automobile telephone exchange 20 includes a test console 11 for inputting test conditions for an inter-mobile-terminal test, a test monitoring section 13 for monitoring the inter-mobile-terminal test to check whether it is performed in accordance with the test conditions, and a control section 12 for connecting the test console 11 and the test monitoring section 13 to each other.

The cellular automobile telephone exchange 20 further includes an exchange speech communication unit 14, a base station unit 15, and a transmission/reception antenna 16. An operator is stationed at the exchange 20 side and inputs a con, hand requesting test information and the like through the test console 11.

A mobile test terminal (to be simply referred to as a terminal hereinafter) 30 moved in a given cell is constituted by an antenna 1, a transmitter/receiver hybrid unit (HB) 2, a receiver (RX) 3, a transmitter (PTX) 4, an automatic incoming call control section 5, an automatic outgoing call control section 6, a test control section 7, a test condition storage section 8, an input/output section 9, and a local maintenance terminal 10 such as a personal computer.

Figure 2:
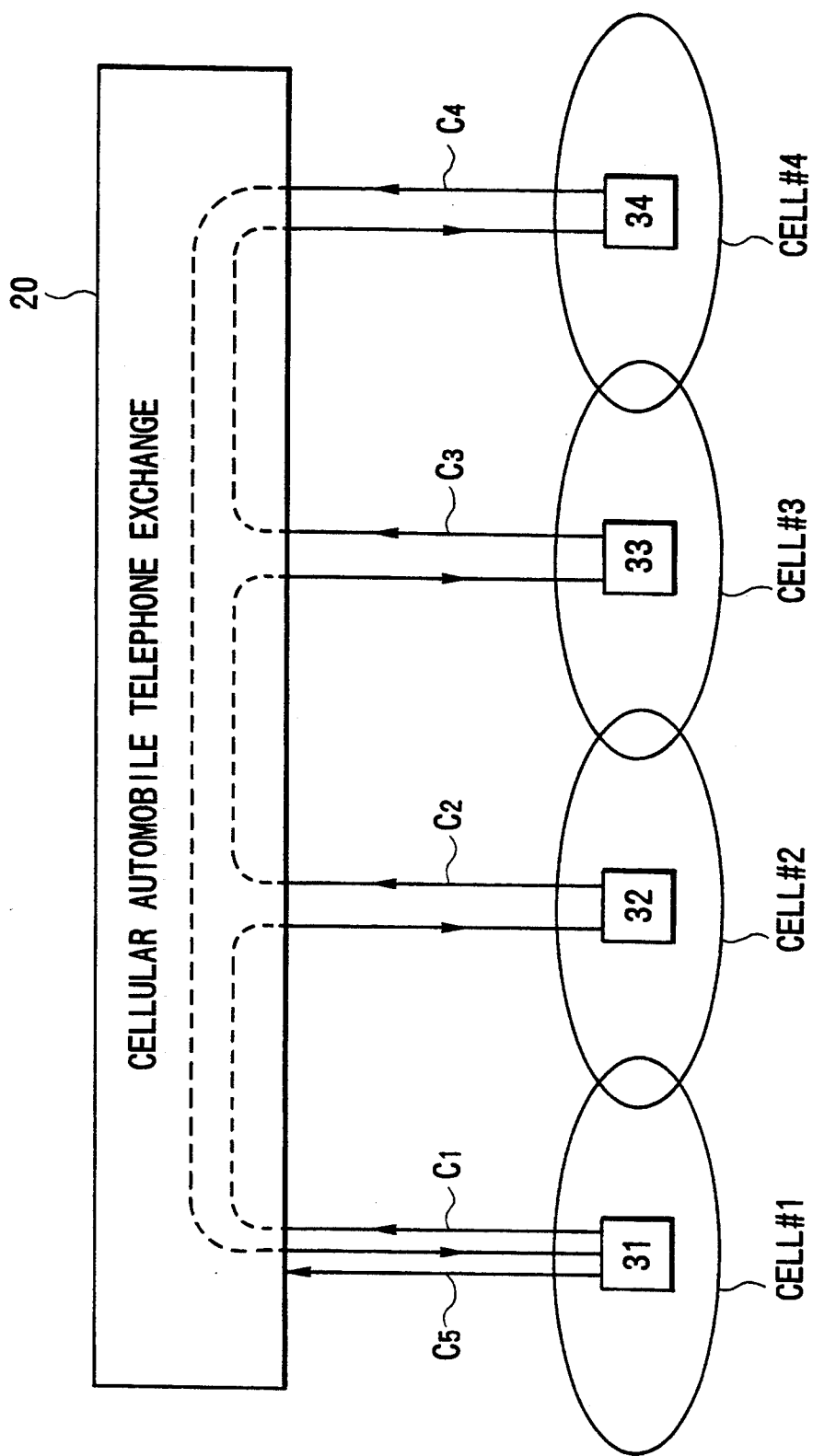
FIG. 2 is a view illustrating a test sequence according to the embodiment of the present invention.

FIG. 2 shows a sequence of an inter-mobile-terminal test in each cell, which test is to be performed with respect to cells #1 to #4. Assume that terminals 31 to 34, each having the same arrangement as that of the terminal 30 shown in FIG. 1, are respectively moved in cells #1 to #4. In this embodiment, a call C1 is made from the first terminal 31 as a start point in the test sequence to the second terminal 32, and a call C2 is made from the second terminal 32 to the third terminal 33.

Furthermore, a call C3 is made from the third terminal 33 to the fourth terminal 34, and a call C4 is made from the last terminal 34 to the first terminal 31 as the start point to transmit an accumulated test result (to be described later) thereto. Finally, a call C5 is made from the first terminal 31 to the cellular automobile telephone exchange 20 to transmit the accumulated test result thereto.

In order to execute the above-described procedure, test conditions with the format shown in FIG. 3 are down-loaded into the respective terminals through the test console 11.

Since the test is performed in the order of the terminals 31 to 34 in this embodiment, as shown in FIG. 3, the test sequence information of the test conditions is constituted by "001" for the terminal 31, "010" for the terminal 32, "011" for the terminal 33, and "100" for the terminal 32.

The start-point terminal information is the terminal number (dial number) of a terminal serving as a start point in the test. In the embodiment, the start-point terminal information is the dial number of the terminal 31. The next terminal information is the number of a terminal which is to generate a call immediately after a given terminal generates an outgoing call. For example, the dial number of the terminal 33 is next terminal information with respect to the terminal 32.

The test data is predetermined pattern data, e.g., "100111001".

These test conditions are input through the console 11 for each terminal to be sequentially down-loaded therein. The test conditions down-loaded in the respective terminals are respectively stored in the test condition storage sections 8 in the terminals.

After the down-load operation, the operator inputs a test start command, and transmits it to the start point 31. In response to this command, the terminal 31 refers to the next terminal number of the test conditions in the storage section 8 and makes the call C1 to the terminal 32.

When the transmission/reception of the call between the terminals 31 and 32 is accomplished, and transmission/reception of information (to be described later) is completed, the terminal 32 makes the call C2 to the third terminal 33 as a next terminal. Similarly, transmission/reception of the calls C3 and C4 is repeated.

In this case, each terminal transmits information with the format shown in FIG. 4 to the next terminal, which information includes self-test sequence information, accumulated test result information, and test data "100111001".

The accumulated test result information is constituted by connection determination results (two-binary-digit data), each indicating connection determination between a given terminal and a next terminal, and data determination results (two-binary-digit data). Each connection determination result is data indicating whether connection is "valid" or "invalid". Each data determination result is data indicating whether test data is "valid" or "invalid".

Note that test data down-loaded in advance from the exchange 20 into the storage section 8 is transmitted to a next terminal.

At the terminal 34, the accumulated test result shown in FIG. 4 can be finally obtained. The terminal 34 then transmits the result to the start-point terminal 31 upon making the call C4. Upon reception of the accumulated test result, the start-point terminal 31 transmits the result to the cellular automobile telephone exchange 20 upon making the call C5.

If a data error is caused (assume that connection is "valid") in the series of the repetitive test operations described above, error information is written in a corresponding data determination information portion of "data determination" of the accumulated test result information shown in FIG. 4.

A case will be described below, in which a connection error is caused in the series of the respective test operations described above. If normal connection is performed, each of the terminals 32 to 34 subsequent to the first terminal transmits test completion information to a corresponding one of the first to third terminals 31 to 33 as a transmission source.

If this information is not received within a predetermined period of time, each of the transmission sources 31 to 33 determines a connection error and transmits accumulated test result information to the terminal 31 as the start-point terminal. Each terminal can identify the terminal 31 as the start-point terminal on the basis of the information of the head portion of the test conditions stored in the storage section 8 as shown in FIG. 3.

Upon reception of this test result information, the start-point terminal 31 transmits it to the exchange 20. With this operation, the operator can monitor the test result to determine a connection error in a specific portion.

According to the present invention, since tests among mobile terminals can be automatically performed from the cellular automobile telephone exchange side, tests for a large number of arbitrary combinations of cells can be performed.

What is claimed is:

1. An inter-mobile-terminal testing method in a cellular automobile telephone system including a cellular automobile telephone exchange and test mobile terminals respectively arranged in cells, a communication test being performed between said cells, comprising the steps of:

transmitting and down-loading test sequence information indicating a test sequence, next terminal number information indicating a terminal which is to make a next call, and test data from said cellular automobile telephone exchange to each of said terminals;

outputting a test start command from said cellular automobile telephone exchange to a first terminal serving as a start point;

causing said first terminal to make a call, through said cellular automobile exchange, to a second terminal as a next terminal in accordance with the next terminal number information in response to the test start command so as to transmit the test data thereto;

causing said second terminal to transmit connection determination information indicating success in connection of the call and data determination information indicating correct reception of the test data through said cellular automobile exchange to a third terminal as a next terminal together with the test data;

subsequently executing the same procedure up to an nth terminal as a last terminal; and acquiring an accumulated result of the connection determination information between said respective terminals and the data determination information in said cellular automobile telephone exchange.

2. A method according to claim 1, wherein the step of transmitting and down-loading the test sequence information comprises the step of also down-loading number information of said first terminal as the start point to each terminal, and further comprising the steps of causing each of said second to nth terminals to transmit test completion information to a corresponding one of said first to (n−1)th terminals upon completion of reception of the information, causing each of said first to (n−1)th terminals to refer to the number information of said first terminal and transmit an accumulated result of the connection determination information and the data determination information up to a self-terminal to said first terminal if the test completion information is not received within a predetermined period of time, and causing said first terminal to transmit the accumulated result, which is the received information, to said cellular automobile telephone exchange.

* * * * *

UNITED STATES PATENT AND TRADEMARK OFFICE
CERTIFICATE OF CORRECTION

PATENT NO. : 5,357,557
DATED : October 18, 1994
INVENTOR(S) : Yukinori Sakakura

It is certified that error appears in the above-indentified patent and that said Letters Patent is hereby corrected as shown below:

Column 1, line 41, delete "con, hand", and insert therefor --command--.

Column 2, line 20, delete "con, hand" and insert therefor --command--.

Signed and Sealed this

Twentieth Day of December, 1994

Attest:

BRUCE LEHMAN

*Attesting Officer*  *Commissioner of Patents and Trademarks*